(12) United States Patent
Essers et al.

(10) Patent No.: US 11,780,999 B2
(45) Date of Patent: *Oct. 10, 2023

(54) POLYMER COMPOSITION FOR IMPROVED GRADE PLASTICS FROM RECYCLED MATERIAL

(71) Applicant: QCP HOLDING B.V., Geleen (NL)

(72) Inventors: Franciscus Elisabeth Jacobus Essers, Geleen (NL); Martinus Hendrikus Maria Van Enckevort, Geleen (NL); Marc Peter August Houtermans, Geleen (NL); Johannes Venerius, Geleen (NL)

(73) Assignee: QCP HOLDING B.V., Geleen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,073

(22) Filed: Jul. 28, 2022

(65) Prior Publication Data

US 2022/0363879 A1 Nov. 17, 2022

Related U.S. Application Data

(63) Continuation of application No. 17/607,472, filed as application No. PCT/EP2020/061781 on Apr. 28, 2020, now Pat. No. 11,427,704.

(30) Foreign Application Priority Data

Apr. 29, 2019 (EP) .................................... 19171582

(51) Int. Cl.
 *C08L 23/12* (2006.01)

(52) U.S. Cl.
 CPC ......... *C08L 23/12* (2013.01); *C08L 2205/035* (2013.01); *C08L 2207/04* (2013.01); *C08L 2207/20* (2013.01)

(58) Field of Classification Search
 CPC .. C08L 2207/20; C08L 2207/04; C08L 53/02; C08L 53/025; C08L 23/12; C08L 23/06
 See application file for complete search history.

(56) References Cited

U.S. PATENT DOCUMENTS

| 11,427,704 B2 * | 8/2022 | Essers .................... C08L 23/12 |
| 2002/0037954 A1 | 3/2002 | Ohkawa et al. |
| 2018/0186971 A1 | 7/2018 | Herring et al. |

FOREIGN PATENT DOCUMENTS

| CN | 103030882 A | 4/2013 |
| CN | 106687519 A | 5/2017 |
| CN | 108003430 A | 5/2018 |
| CN | 106046537 B | 1/2019 |
| WO | 2014147106 A2 | 9/2014 |

OTHER PUBLICATIONS

Chinese Office Action dated Feb. 1, 2023 for family member Application No. 202080032574.0.

\* cited by examiner

*Primary Examiner* — Mark S Kaucher
(74) *Attorney, Agent, or Firm* — Hudak, Shunk & Farine Co. LPA

(57) ABSTRACT

A polymer composition including
 60-80 wt % of a recycled polypropylene;
 10-35 wt % of a recycled polyethylene;
 5-20 wt % of a polyolefin elastomer (POE);
 0.1-10 wt % styrene ethylene butylene styrene block copolymer (SEBS);
 wherein the wt % is relative to the total weight of the polymer composition;
 wherein the polymer composition includes at least 11 wt % of polyolefin elastomer and styrene ethylene butylene styrene block copolymer.

20 Claims, No Drawings

POLYMER COMPOSITION FOR IMPROVED GRADE PLASTICS FROM RECYCLED MATERIAL

FIELD OF THE INVENTION

The present invention relates to an improved polymer composition containing a high amount of recycled polypropylene (PP) and polyethylene (PE). As well as to the use of such polymer composition in the manufacturing of articles, the articles manufactured from said polymer composition and to the process of preparing such polymer composition.

BACKGROUND OF THE INVENTION

The omnipresence of plastic packaging and the importance of environmental policy have led to the increased importance of recycled plastic materials. The recycling of paper, textiles, glass or metals is already carried out on a large scale, whether by separate collection or by sorting of the recyclate. The recycling of plastic waste and re-use of plastics is also increasing.

Virgin polymer composition replacement is considered to represent the only way forward to solve the global plastic waste problem, to stop the depletion of natural resources, and to facilitate a circular economy.

To-date recycled polymer compositions are available, in the form of flakes or granules, that are obtained from the collection of polyolefin packaging, containers or films are available on the market, wherein the polyolefins are present within the recycled polymer composition at a low percentage of between 5-8 wt % and the remaining between 92-95 wt % of the polyolefins are made-up of virgin polyolefins.

The aim of the invention is to produce a polymer composition containing a high amount of recycled polyolefin that can compete with virgin material with respect to product performance and price. To-date polymer compositions of recycled polyolefin blends cannot compete with the impact strength and stiffness of virgin polyolefin blends.

The currently available polymer compositions of polyolefins suffer from polystyrene contaminants, rubber contaminants and variability and poor consistency of the recycled plastic feeds. Subsequently the currently available polymer compositions of polyolefins have a low impact strength and stiffness when compared to virgin materials.

It is a further aim of the invention to produce a polymer composition of recycled polyolefins that can be used to manufacture blow moulded and injection moulded packaging as well as durable products without need for further blending with virgin polyolefin materials.

There is currently no known polymer composition containing a high percentage of recycled polyolefins (at least 75 wt %, preferably 80 wt %, more preferably 85 wt %, of polyolefins from recycling, within the polymer composition) with properties fit for consumer products, manufactured through processes such as for example blow-moulding and injection moulding, and with a high impact strength and stiffness. The wt % is relative to the total weight of the polymer composition, if not stated otherwise.

The source of materials for polymer composition of recycled polymer material can be food and household goods packaging, e.g. polyolefin plastics (such as for example PP and PE) that can be contaminated by other polymer families, such as for example styrene polymers.

Styrene polymers are used in the production of packaging and containers for perishable foods, in the form of polystyrene (PS); in the production of industrial packaging, in the form of acrylonitrile butadiene styrene (ABS); in the production of packaging, containers and as fillers for packaging and containers, in the form of expanded polystyrene (EPS). Thus, styrene polymers need to be removed during the processing of the to be recycled materials. A complete removal is technically and economically not possible. But any remaining residual polystyrene has a significant negative impact on the mechanical properties of the recycled polyolefins composition. EPS for example accelerates radical generation and therewith material degradation, and renders articles manufactured more brittle. Further, polyethylene terephthalate (PET) has a negative impact on the mechanical properties of the polymer composition.

Polyvinyl chloride (PVC), polyvinylidene chloride (PVDC) and styrene polymers are considered to be only partially compatible with PP and PE, especially when recycling to produce a new recycled polyolefin blend using extrusion.

The coexistence of significant percentages of other polymer contaminants together with the recycled polyolefins coming from recycled packaging has to be accepted, in order to make available a polymer flake or granule from recycling at competitive costs with respect to virgin polyolefin materials.

An additional problem in the use of recycled polyolefin polymer compositions, particularly from recycled packaging, is the variability and poor consistency of the polymer in the feed. Thus, this variability and poor consistency is also found within the regenerated granule or flake and produced articles. This variability and poor consistency of the polymer leads to an aesthetically unacceptable surface and inconstant mechanical properties of the final products. At the same time, the use of said granules in injection moulding processes is limited or prevented by at least one of the following defects extreme brittleness, low impact strength and stiffness, of granules or flakes and products obtained from recycling.

SUMMARY OF THE INVENTION

It is an object of the present invention to solve at least one of the above-listed problems. Further object of the invention is to obtain a polymer composition that can be efficiently used in the moulding processes, particularly injection moulding, wherein the percentage of recycled polyolefins within the polymer composition is high, i.e. at least 70 wt %, preferably 75 wt %, more preferably 80 wt %, most preferably 85 wt % of polyolefins from recycling, in the polymer composition. The polymer composition can be used to produce flakes or granules and products at competitive costs with high impact strength and stiffness, when compared to virgin polyolefin products. The polymer composition can produce a product that has a high impact strength (Charpy) and optionally has increased stability upon exposure to the environment, such as for example temperature, humidity or sun exposure.

The invention relates to a polymer composition comprising:
  60-80 wt % of a recycled polypropylene;
  10-35 wt % of a recycled polyethylene;
  5-20 wt % of a polyolefin elastomer (POE);
  0.1-10 wt % styrene ethylene butylene styrene block copolymer (SEBS);
  wherein the wt % is relative to the total weight of the polymer composition;

wherein said polymer composition comprises at least 11 wt % of polyolefin elastomer and styrene ethylene butylene styrene block copolymer.

The recycled PP and recycled PE polymer composition according to the invention has an increased impact strength compared to standard recycled PP and recycled PE polymer compositions, despite contamination with other polymers. The tensile modulus stays on a high level, while the impact strength has been improved. The polymer composition of the invention can have a melt flow rate sufficient for efficient injection moulding. Further, the invention can allow for controlled shrinkage during and/or after processing.

The invention has at least one of the following advantages usability of the polymer composition for moulding, especially injection moulding, reduced need for peroxides, increased impact strength relative to other recycled PP and recycled PE polymer compositions.

DETAILED DESCRIPTION OF THE INVENTION

The polymer composition preferably comprises a high amount of a recycled polypropylene and recycled polyethylene, with added styrene ethylene butylene styrene block copolymer and polyolefin elastomer; and optionally additives.

Recycled Polypropylene

The PP raw material comprises plastic waste, predominantly post-consumer waste (PCW) PP packaging waste, such as for example detergent and shampoo bottles, dairy pots and meat trays, etc. The PP raw material waste can be pre-sorted by waste management companies. One suitable PP source can for example be the waste material collected under the DSD 324 (05-2012) and DSD 324-1 standard (03-2018).

The PP DSD 324 (05-2012) raw material can comprise at least one of the following used, residue-drained, rigid, system-compatible items made of polypropylene, e.g. bottles, cups and trays, incl. secondary components such as lids, labels etc. The PP DSD 324 (05-2012) raw material can comprise a maximum total amount of impurities 6% by mass. The impurities in the PP DSD 324 (05-2012) raw material can comprise other metal items <0.5% by mass, rigid PE items <1% by mass, expanded plastics incl. EPS items <0.5% by mass, plastic films <2% by mass and other residues <3% by mass. Further examples of impurities in PP DSD 324 (05-2012) raw material can comprise glass, paper, board, cardboard, composite paper/cardboard materials (e.g. liquid packaging boards), aluminised plastics, other materials (e.g. rubber, stones, wood, textiles, nappies) and compostable waste (e.g. food, garden waste).

A second standard for recycled PP is the PP DSD 324-1 standard (03-2018). This standard is very comparable to the PP DSD 324 standard discussed above, except that the recycled PP can contain more film material, up to about 10 wt %. This film material comprises both recycled PP film (such as for example bioriented PP (BOPP)) PE film. The PP DSD 324-1 standard (03-2018) raw material can comprise a maximum total amount of impurities 4% by mass. The impurities in the PP DSD 324-1 standard (03-2018) raw material can comprise other metal items <0.5% by mass, rigid PE items <1% by mass, expanded plastics incl. EPS items <0.5% by mass, paper, cardboard, carton, composite paper/cardboard materials (e.g. liquid packaging boards) <1% by mass, other residues <3% by mass. Further examples of impurities in PP DSD 324-1 standard (03-2018) raw material can comprise glass, aluminised plastics, other materials (e.g. rubber, stones, wood, textiles, nappies) and compostable waste (e.g. food, garden waste).

Examples of recycled PP are EXPP152A (MFR 15)/300P and EXPP163A (MFR 50)/300T.

Optical sorting can also be used to remove unwanted polymers, but polystyrene or polyethylene contamination in the feed still occurs and has a substantial negative impact on the mechanical properties of the recycled polymer composition.

PP is available in three different varieties, PP homopolymers (PPh), PP random copolymer (PPr) and PP impact copolymer (or heterophasic PP copolymer, PPc).

The waste material can for example be characterized as originating from following sources (a) extrusion sheet and film material, mostly PP homopolymers (PPh) and PP random copolymers (PPr), virtually without rubber (such as for example biaxially-oriented polypropylene (BOPP)); and (b) injection moulded material, which are a mix of PP homopolymer (PPh), PP random copolymers (PPr) and impact copolymer (PPc), containing about 15 wt % rubber.

The recycled PP can contain approximately half of packaging material (BOPP) and half of rubber-containing injection moulded material. This injection moulded material can contain rubbers, such as for example C2-C3 rubber, thermoplastic elastomers (TPE), ethylene propylene diene methylene (EPDM) or ethylene propylene rubber (EPR).

The resulting mix of the recycled PP itself used in the polymer composition can for example have a rubber content of between 1.5-12 wt % (rubber from rubber-containing injection moulded material; wherein wt % is relative to the total amount of the mix of the recycled PP). On top of the rubber from the rubber-containing injection moulded material additional rubber has been added to the polymer composition. The additional rubber comprises at least POE and SEBS.

The recycled PP content of the polymer composition is preferably made-up of between 25-75 wt % BOPP and between 25-75 wt % rubber-containing injection moulded material; wherein wt % is relative to the total amount of recycled PP.

The recycled PP is present between 60-80 wt %, preferably 60-77.5 wt %, more preferably between 62-75 wt %, within the polymer composition; wherein wt % is relative to the total weight of the polymer composition.

Recycled Polyethylene

The recycled PE comprises PE waste collected under the DSD 329 standard (April/2009), PE waste based on UK milk bottles, PE waste based on French milk bottles, PE vessels having a volume of 5 litres or more and being cleaned in accordance with environmental specifications or PE extrusion pipes. Further PE sources are not excluded.

The recycled PE DSD 329 standard (April/2009) raw material can comprise at least one of the following used, completely emptied, rigid, system-compatible articles made of polyethylene, e.g. bottles and dishes, incl. packaging parts such as caps, lids, labels etc. The recycled PE DSD 329 standard (April/2009) raw material raw material can comprise a maximum total amount of impurities 6% by mass. The recycled PE DSD 329 standard (April/2009) raw material can comprise other metal articles <0.5 mass %, dimensionally stable PP articles <3 mass %, foamed plastics incl. EPS articles <0.5 mass %, plastic films <5 mass % and other residual materials <3 mass %. Further examples of impurities in recycled PE DSD 329 standard (April/2009) raw material can comprise glass, paper, cardboard, composite paper/cardboard materials (e.g. beverage cartons), aluminised plastics, other materials (e.g. rubber, stones, wood, textiles, nappies) and compostable waste (e.g. food, garden waste).

An example of recycled PE from DSD 329 standard (April/2009) raw material is HDPE 5404 0216.

The recycled PE preferably comprises recycled High-Density Polyethylene (HDPE) to at least 90 wt %, more preferably at least 92 wt %, most preferably at least 95 wt %.

The recycled PE collected according to the DSD 329 standard contains a variety of contaminants which can have a negative effect when used in blow-moulding. These are removed by means of a plurality of steps, including cleaning steps, washing steps and sorting steps. The recycled PE can for example be split into different streams, such as a film fraction (PE+EPS), alight fraction and a dark fraction. The PE recyclate may preferably comprise 0-6 wt %, more preferably between 1-5 wt %, most preferably between 3-4.5 wt % polypropylene and up to 1 wt % polystyrene contaminants, wherein wt % is relative to the total amount of recycled PE.

The recycled PE preferably has a density in the range of approximately 0.94-0.97 g/cm$^3$ and can have different molecular weight distributions. A standard Gaussian distribution of the molecular weight is called 'monomodal'. A specific and broad distribution is called 'bimodal'. The PE may have an in-between modality of '1.5× monomodal'.

The MFR of the PE (2.16 kg, 190° C.) may preferably be in the range of 0.1-0.5 which is suitable for blow moulding materials. The PE may be a light recyclate. The recycled PE may preferably have a L* value between 71-80, a* value between −6 to 0 and a b* value between 0-12; as determined on the basis of CIELAB.

The recycled PE may preferably have an MFR 2.16 kg, 230° C. (g/10 min) of between 0.4-0.9, more preferably between 0.45-0.85.

The recycled PE may preferably have an MVR 2.16 kg, 230° C. (ml/10 min) of between 0.3-1.3, more preferably between 0.6-1.0. The recycled PE may preferably have a Charpy (23° C., kJ/m$^2$) of between 10-20, more preferably between 12-17. The recycled PE may preferably have a density (kg/m$^3$) of between 850-1050, more preferably between 900-1000. The recycled PE may preferably have a Tensile modulus (MPa) of between 1030-1230, more preferably between 1080-1180.

Standard virgin PP and virgin PE blend polymer compositions have a Tensile stiffness between 600-1300 MPa and Charpy Notched Impact strength of between 23-50 kJ/m$^2$. The mechanical properties of the polymer composition according to the present invention are very close to the values of the mechanical properties of virgin materials.

The recycled PE is present between 10-35 wt %, preferably 12-35 wt %, more preferably between 15-25 wt %, within the polymer composition, wherein wt % is relative to the total weight of the polymer composition.

The recycled PE is preferably present in the polymer composition at a weight ratio between of 3:1-1:1 with the POE, within the polymer composition.

Additional Rubber

Two types of rubber have been surprisingly found to improve the impact strength of the final product produced using the polymer composition of the invention, while keeping up high tensile modulus. The first type is POE and the second rubber used is SEBS rubber.

The polymer composition preferably has a total rubber content of between 5-24 wt %, more preferably between 8-20 wt %, most preferably between 11-18 wt %, as determined with cold xylene solubles (CXS).

The polymer composition comprises at least 11 wt %, preferably at least 12 wt % of polyolefin elastomer and styrene ethylene butylene styrene block copolymer.

Polyolefin Elastomer

The polymer composition comprises a polyolefin elastomer (POE) which is an ethylene alpha olefin copolymer. Examples of POE are C2-C4 copolymers, C2-C6 copolymers and C2-C8 copolymers.

The POE can preferably be a C2-C6 copolymer or a C2-C8 copolymer with between 70-80 wt % ethylene, more preferably between 73-78 wt %, most preferably between 74-77 wt %; wherein wt % is relative to the POE.

The POE used in the invention preferably comprises an ethylene (C2) octene (C8) metallocene rubbers with a blocky structure.

The POE preferably has a density of between 0.85-0.89, more preferably between 0.855-0.885, most preferably between 0.86-0.875.

The POE preferably has an MFR of between 0.3-1, more preferably between 0.4-0.8, most preferably between 0.45-0.7 (190° C., 2.16 kg).

The added C2-C8 rubber can match the C2-C3 rubber in the injection moulded materials. This has a surprisingly positive effect on the impact strength of the polymer composition.

The addition was further found to also surprisingly increase the stiffness. The C2-C8 rubber can also increase flow or allow for reduction in use of the peroxide in the process.

The POE is preferably selected from the group of Infuse or Engage polymers, such as for example infuse 9107, Infuse 9077 and Engage XLT8677.

The POE is present at between 5-20 wt %, preferably 6-20 wt %, more preferably between 6-15 wt %, within the polymer composition.

Styrene Ethylene Butylene Styrene Block Copolymer

The second type of rubber of the polymer composition is a SEBS rubber.

SEBS rubbers are (partly) hydrogenated styrene-butadiene-styrene block copolymers. They belong to the family of styrenic block copolymers (SBC). These polymers are triblock copolymers, having styrene at both extremities of the polymer chain with an internal polybutadiene, polyisoprene or hydrogenated polybutadiene or polyisoprene block.

SEBS copolymers are commercially available, for example under the tradenames of Kraton and Tuftec, such as for example Kraton SEBS G1657MS.

The SEBS copolymer surprisingly reduces the negative impact of for example EPS or PET, on the mechanical properties of the polymer composition, such as for example the impact strength.

The SEBS is present between 0.1-10 wt %, preferably 0.1-8 wt %, more preferably 1-4 wt %, more preferably between 0.2-3 wt %, more preferably between 0.3-2 wt %, most preferably 0.4-1.5 wt %, within the polymer composition.

Additives

The polymer composition can further comprise between 0.05-10 wt %, preferably 0.1-8 wt %, of additives, within the polymer composition.

Additives comprise stabilizers, peroxides, calcium oxides (CaO), EBA wax, pigment binders, talc or colorants.

A stabilizer can be added, such as for example masterbatches like Tosaf ME 833848, which is a blend of about 70 wt % Low-Density Polyethylene (LDPE) with a phenolic stabilizer and an Irgafos. The stabilizer may preferably be added to the polymer composition between 0-4 wt %, more preferably between 0.1-1.5 wt %. Further examples of stabilizers are Exxelor PE1040 and Irganox B225.

A peroxide, in the form of an organic compound or masterbatch can be added. The peroxide improves the flow of the material. The peroxide can for example be selected from the group of Zebraflow T028, Zebraflow T0214 or Zebraflow T0318. The peroxide can for example be used to shorten the polymer chains thereby lowering viscosity and improving flow of the polymer composition. Between 0-2 wt % of a masterbatch can for example be added, such a masterbatch can contain for example between 2-10 wt % of a suitable peroxide. The peroxide can preferably be added to the polymer composition between 0-4 wt %, more preferably between 0.05-1.5 wt %.

A calcium oxide (CaO) can be added to inhibit release of HCl. The CaO can for example be added as a masterbatch with for example LDPE. An example of a CaO suitable for the invention Is W & R Master Desiccant 60003. CaO can preferably be added in a range between 0-4 wt %, more preferably between 0.05-2 wt %, most preferably 0.1-1.5 wt %.

A pigment binder can preferably be added between 0-4 wt %, more preferably between 0.1-1.5 wt %. For example, a PE-maleic anhydride can be added as a pigment binder to the polymer composition between 0.1-2 wt %, preferably between 0.2-1 wt %, more preferably between 0.5-1 wt %.

Talc can be added, an example of suitable talc is Steamic OOSd.

A black colorant can preferably be added to the polymer composition between 0.1-5 wt %, more preferably between 1-2 wt % in the form of a masterbatch blend.

Ash

The ash content of the polymer composition may for example be between 4-8 wt %.

Composition

The composition according to the present invention has surprisingly good mechanical properties.

The polymer composition has preferably a melt flow rate MFR (230° C., 2.16 kg) of between 5-25 g/10 min, more preferably between 12-18 g/10 min.

The polymer composition has preferably a modulus ranging between 600-1300 MPa, more preferably between 700-1200 MPa.

The polymer composition preferably has a Charpy notched impact strength of between 20-60 kJ/m$^2$, preferably 23-50 kJ/m$^2$, more preferably between 25-35 kJ/m$^2$, more preferably between 22-55 kJ/m$^2$, most preferably 26-51 determined using ISO 179-1eA:2010.

The composition according to the present invention can fulfil the ISO 14021:2016 standard and label as Type II environmental using ISO 14021:2016.

Process

The invention further relates to a process for preparing the polymer composition of the invention.

This process comprises the steps of
a) treating a mixed polyolefin recyclate fraction with water without added thermal energy;
b) treating the solution obtained mixed polyolefin recyclate fraction from a) in a washing step with an alkaline medium at a temperature of at least 60° C.;
c) sorting of the mixed polyolefin recyclate fraction solution obtained from b) obtaining a PE recyclate and/or mixed PP recyclate fraction, wherein steps a) and b) can also be carried out in the reverse order;
d) treating the PE recyclate and/or mixed PP recyclate fraction solution obtained from the above steps at a temperature in the range of between 50-155° C., preferably for a period of at least 60 minutes.
e) adding the dried PE recyclate and/or mixed PP recyclate fraction obtained from step d) to an extruder with the addition of the POE and SEBS; optionally additives; wherein the mix Is processed to obtain a recycled PP and recycled PE material.
wherein step e) is conducted between 200-250° C., preferably between 210-240° C., more preferably between 220-230° C. for between 1-10 minutes.

The process of making the polymer composition may comprise compounding and extruding.

The process of making the polymer composition may use a co-rotating twin screw tandem extruder to which the recycled polypropylene, recycled polyethylene, styrene ethylene butylene styrene block copolymer and polyolefin elastomer, and optionally additives are added.

Additives can be added in a reclaim extruder (first extruder) and a compounding extruder (second extruder) of a tandem extruder.

Articles

The polymer composition can be presented in granule or flake form to be used for manufacturing articles.

The polymer composition of recycled PP and recycled PE is suitable for manufacturing products for long-term use, such as for example boxes, trays, paint pails or consumer goods.

The articles made from the polymer composition are preferably formed by injection moulding.

Embodiments

In a preferred embodiment the polymer composition comprises 60-80 wt % of a recycled polypropylene, 10-35 wt % of a recycled polyethylene, 5-20 wt % of a polyolefin elastomer (POE) and 0.1-4 wt % styrene ethylene butylene styrene block copolymer (SEBS), wherein said polymer composition comprises at least 11 wt % of polyolefin elastomer and styrene ethylene butylene styrene block copolymer.

In another embodiment the polymer composition comprises 62-75 wt % of a recycled polypropylene, 10-35 wt % of a recycled polyethylene, 5-20 wt % of a polyolefin elastomer (POE) and 0.1.4 wt % styrene ethylene butylene styrene block copolymer (SEBS), wherein said polymer composition comprises at least 11 wt % of polyolefin elastomer and styrene ethylene butylene styrene block copolymer.

In another embodiment the polymer composition comprises 62-75 wt % of a recycled polypropylene, 15-25 wt % of a recycled polyethylene, 5-20 wt % of a polyolefin elastomer (POE) and 0.1-4 wt % styrene ethylene butylene styrene block copolymer (SEBS), wherein said polymer composition comprises at least 11 wt % of polyolefin elastomer and styrene ethylene butylene styrene block copolymer.

In another embodiment the polymer composition comprises 62-75 wt % of a recycled polypropylene, 15-25 wt % of a recycled polyethylene, 6-15 wt % of a polyolefin elastomer (POE) and 0.5-1.5 wt % styrene ethylene butylene styrene block copolymer (SEBS), wherein said polymer composition comprises at least 11 wt % of polyolefin elastomer and styrene ethylene butylene styrene block copolymer.

In another embodiment the polymer composition comprises 60-80 wt % of a recycled polypropylene, 10-35 wt % of a recycled polyethylene, 6-15 wt % of a polyolefin elastomer (POE) and 0.5-1.5 wt % styrene ethylene butylene styrene block copolymer (SEBS), wherein said polymer composition comprises at least 11 wt % of polyolefin elastomer and styrene ethylene butylene styrene block copolymer.

In another embodiment the polymer composition Is preferably used for injection moulding of articles.

The polymer composition according to the invention may further comprise optional components different from the previously mentioned components of the polymer composition, such as additives, wherein the total of the previously mentioned components and the optional components is 100 wt % of the total polymer composition.

Accordingly, the invention relates to a polymer composition consisting of the previously mentioned components and the optional components.

It Is noted that the invention relates to all possible combinations of features described herein, preferred in particular are those combinations of features that are present in the claims. It will therefore be appreciated that all combinations of features relating to the polymer composition according to the invention; all combinations of features relating to the process according to the invention and all combinations of features relating to the polymer composition according to the invention and features relating to the process according to the invention are described herein.

It is further noted that the term 'comprising' does not exclude the presence of other elements. However, it is also to be understood that a description on a product/polymer composition comprising certain components also discloses a product/polymer composition consisting of these components. The product/polymer composition consisting of these components may be advantageous in that it offers a simpler, more economical process for the preparation of the product/polymer composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

Quality Testing and Standards

For quality testing samples are taken during processing and from the end product. The Melt Mass-Flow Rate (MFR) is measured at day 3 and day 10 of ageing.

The MFR and Melt Volume-Flow Rate (MVR) are assessed using the ISO 1133-1:2011, 2.16 kg, T=230° C. For POE and PE, the MFR and MVR are assessed using the ISO 1133-1:2011 at 190° C. under 2.16 kg.

The color of the product during and at the end of the process is identified using the CIELAB (L, a*, b*). L* identifies the amount of light versus dark; a* refers to red-green and b* refers to blue-yellow. These are parameters standardized by the International Commission for Illumination (CIE) in 1976 and known as CIELAB.

The cold xylene solubles (CXS) is measured using the ISO 16152:2005, T=25° C.

The ash content of the polymer composition or product is measured using the ISO3451-1 2008.

The density of the polymer composition or product is measured using the ISO 1183-1:2019, T=23° C., tensile bar.

The tensile strength/test of the polymer composition or product is measured using the ISO 527-1A:2012, T=23° C., 11.

The flexural of the polymer composition or product is measured using the ISO 178:2010, T=23° C., II.

The tensile bar test of the moulded articles from the polymer composition or product is measured using the ISO 527-1A'2012.

The Charpy of the moulded articles from the polymer composition or product is measured using the ISO 179-1eA: 2010 (T=−20° C. and T=23° C., 11, moulded bar 527/1A-notched) and ISO 179-1eA:2010 (T=−20° C. moulded bar 527/1A-unnotched).

Extrusion products and injection-moulded articles are produced and assessed following ISO19069-2:2016, ISO294-1:2017 and ISO294-3:2002.

Product Examples

A polymer composition of a recycled PP and HDPE were prepared.

POE used was Infuse 9077

As stabilizer 0.75 wt % TOSAF was used.

As CaO a masterbatch containing 70 wt % CaO was used (particle size <10 μm).

EXPP152A and EXPP163A are recycled PP, according to DSD 324 standard.

HDPE54040216 is a recycled HDPE according the DSD 329 standard (April/2009).

DOW Infuse 9077 is a POE.

Kraton G1657 MS is a SEBS rubber.

TABLE 1

Polymer composition of recycled PP and recycled PE and their main properties

| | Sample | | | | | | | | |
|---|---|---|---|---|---|---|---|---|---|
| | Ex1 | Ex2 | Ex3 | Ex4 | Ex5 | Ex6 | Ex7 | CE1 | CE2 |
| EXPP152A(MFR 15)/300P | 67.6 | 67.1 | 42.00 | 76.80 | 42.00 | 66.8 | 67.2 | | |
| EXPP163A(MFR 50)/300T | | | 29.80 | | 34.80 | | | 99.6 | 99.6 |
| HDPE 5404 0216 | 20 | 20 | 10 | 10 | 10 | 19 | 20 | | |
| DOW Infuse 9077 | 10 | 10 | 5 | 5 | 5 | 10 | 10 | | |
| Kraton G1657MS | 2 | 2 | 8 | 8 | 8 | 1.5 | 1.5 | | |
| Irganox 8225 | 0.2 | 0.2 | 0.10 | 0.10 | 0.10 | | | 0.20 | 0.2 |
| EBA wax | 0.2 | 0.2 | 0.10 | 0.10 | 0.10 | | | 0.20 | 0.2 |
| Steamic OOSd (talc) | | | 5 | | | | | | |

TABLE 1-continued

Polymer composition of recycled PP and recycled PE and their main properties

| | | | | | | | | | |
|---|---|---|---|---|---|---|---|---|---|
| Exxelor PE1040 | | 0.5 | | | | | | | |
| DOW Infuse 9107 | | | | | | | | | |
| Tosaf ME 833848 | | | | | | 0.75 | 0.75 | | |
| Peroxide | | | | | | 0.3 | 0.3 | | |
| CaO | | | | | | 0.5 | 0.5 | | |
| Aging before testing days | 14 | 14 | 14 | 14 | 14 | | | 14 | 14 |

Density ISO 1183 (T = 23° C.)

| | | | | | | | | | |
|---|---|---|---|---|---|---|---|---|---|
| Density Average kg/m$^3$ | 920 | 921 | 936 | 915 | 913 | 915 | 915 | 915 | 919 |
| Melt Flow ISO 1133 (I 2, 16; 230 C.) | | | | | | | | | |
| MFR g/10 min | 18 | 17 | 16.7 | 11.5 | 16.8 | 15.0 | 15.0 | 16.7 | 51 |
| MVR ml/10 min | 24 | 23 | 21.7 | 15.5 | 22.4 | | | 22.8 | 68 |
| Melt density g/ml | | | 0.770 | 0.742 | 0.750 | | | | |
| Ash Content % | 1.43 | 1.38 | 5.25 | 1.12 | 1.11 | | | 1.24 | 1.41 |

Charpy ISO 179/1eA (T = 23° C., II) moulded bar 527/1A

| | | | | | | | | | |
|---|---|---|---|---|---|---|---|---|---|
| Breaktype (B/O/T) | | | 5 × P | 5 × P | 5 × P | | | | |
| Hammer Type | | | 2 J | 2 J | 2 J | | | | |
| Charpy impact kJ/m$^2$ | 41.6 | 46.7 | 50.77 | 49.58 | 48.62 | 30 | 30 | 5.21 | 4.1 |

Charpy ISO 179/1eA (T = −20° C., II) moulded bar 527/1A

| | | | | | | | | | |
|---|---|---|---|---|---|---|---|---|---|
| Breaktype (B/O/T) | | | 5 × C | 5 × C | 5 × C | | | | |
| Hammer Type | | | 0.5 J | 0.5 J | 0.5 J | | | | |
| Charpy impact kJ/m$^2$ | 7.6 | 8.1 | 5.42 | 5.53 | 6.33 | | | 1.85 | 2.0 |

Tensile ISO 527/1A (T = 23° C., II)

| | | | | | | | | | |
|---|---|---|---|---|---|---|---|---|---|
| E-Modulus (Chord 0.05%-0.25%) N/mm$^2$ | 787 | 800 | 1001 | 885 | 852 | 800 | 800 | 1259 | 1247 |
| Tensile Strain at Break (Elongation at Break) % | 47.2 | 48.2 | 62.2 | 219.4 | 69.4 | | | 27.9 | 16.9 |
| Tensile Strain at Yield (Elongation at yield) % | 10.2 | 10.0 | 10.0 | 11.8 | 10.5 | | | 9.1 | 7.1 |
| Tensile stress at Break N/mm$^2$ | 12.4 | 11.8 | 13.8 | 12.3 | 13.9 | | | 4.8 | 18.6 |
| Tensile strength N/mm$^2$ | | | 19.7 | 20.4 | 19.6 | | | | |
| Yield Stress N/mm$^2$ | 18.7 | 18.6 | 19.7 | 20.4 | 19.6 | | | 27.9 | 26.8 |

Flexural ISO 178 (T = 23° C., II)

| | | | | | | | | | |
|---|---|---|---|---|---|---|---|---|---|
| Flexural modulus (secant) Mpa | 790 | 800 | 1010 | 850 | 847 | | | 1210 | 1220 |
| Flexural strength MPa | 19.8 | 20.2 | 23.1 | 22.2 | 21.8 | | | 32.4 | 32.7 |

Weight of testbar

| | | | | | | | | | |
|---|---|---|---|---|---|---|---|---|---|
| Weight g | | | 26.9 | 26.0 | 26.1 | | | | |

| | Sample | | | | | | | |
|---|---|---|---|---|---|---|---|---|
| | CE3 | CE4 | CE5 | CE6 | CE7 | CE8 | CE9 | CE10 |
| EXPP152A(MFR 15)/300P | | 89.6 | 69.6 | 75.80 | 80.80 | 46.00 | 79.6 | 79.60 |
| EXPP163A(MFR 50)/300T | 79.6 | | | | | 34.80 | | |
| HDPE 5404 0216 | 20 | | 20 | 10 | 10 | 10 | 10 | 10 |
| DOW Infuse 9077 | | 10 | 10 | 5 | 5 | 5 | | 5 |
| Kraton G1657MS | | | | 4 | 4 | 4 | | |
| Irganox 8225 | 0.2 | 0.2 | 0.2 | 0.10 | 0.10 | 0.10 | 0.20 | 0.20 |
| EBA wax | 0.2 | 0.2 | 0.2 | 0.10 | 0.10 | 0.10 | 0.20 | 0.20 |
| Steamic OOSd (talc) | | | | 5 | | | 5 | 5 |
| Exxelor PE1040 | | | | | | | | |
| DOW Infuse 9107 | | | | | | | 5 | |
| Tosaf ME 833848 | | | | | | | | |
| Peroxide | | | | | | | | |
| CaO | | | | | | | | |
| Aging before testing days | 14 | 14 | 14 | 14 | 14 | 14 | 14 | 14 |

TABLE 1-continued

Polymer composition of recycled PP and recycled PE and their main properties

| | Density ISO 1183 (T = 23° C.) | | | | | | | |
|---|---|---|---|---|---|---|---|---|
| Density Average kg/m³ | 926 | 912 | 919 | 942 | 915 | 915 | 951 | 951 |
| Melt Flow ISO 1133 (I 2, 16; 230 C.) | | | | | | | | |
| MFR g/10 min | 29 | 37.4 | 17 | 11.5 | 11.6 | 17.0 | 10.9 | 10.9 |
| MVR ml/10 min | 39 | 50.1 | 23 | 15.3 | 15.6 | 22.7 | 14.5 | 14.5 |
| Melt density g/ml | | | | 0.752 | 0.744 | 0.749 | 0.757 | 0.757 |
| Ash Content % | 1.52 | 1.31 | 1.40 | 5.91 | 1.15 | 1.23 | 6.25 | 6.25 |
| | Charpy ISO 179/1eA (T = 23° C., II) moulded bar 527/1A | | | | | | | |
| Breaktype (B/O/T) | | | | 5 × C | 5 × C | 5 × C | 5 × C | 5 × C |
| Hammer Type | | | | 1 J | 1 J | 1 J | 2 J | 2 J |
| Charpy impact kJ/m² | 4.0 | 7.82 | 15.5 | 12.82 | 13.24 | 14.39 | 8.31 | 8.31 |
| | Charpy ISO 179/1eA (T = −20° C., II) moulded bar 527/1A | | | | | | | |
| Breaktype (B/O/T) | | | | 5 × C | 5 × C | 5 × C | 5 × C | 5 × C |
| Hammer Type | | | | 0.5 J | 0.5 J | 0.5 J | 2 J | 2 J |
| Charpy impact kJ/m² | 2.1 | 3.64 | 7.1 | 3.88 | 4.38 | 5.42 | 2.73 | 2.73 |
| | Tensile ISO 527/1A (T = 23° C., II) | | | | | | | |
| E-Modulus(Chord0.05%-0.25%) N/mm² | 1169 | 1044 | 838 | 1172 | 967 | 944 | 1343 | 1343 |
| Tensile Strain at Break (Elongation at Break) % | 5.3 | 49.4 | 39.8 | 22.3 | 92.5 | 51 | 92.1 | 92.1 |
| Tensile Strain at Yield (Elongation at yield) % | 5.1 | 7.1 | 9.4 | 9.3 | 10.1 | 9.4 | 8.6 | 8.6 |
| Tensile stress at Break N/mm² | 23.4 | 14.0 | 12.4 | 11.8 | 11.4 | 14.3 | 7 | 7 |
| Tensile strength N/mm² | | | | 22.3 | 22.0 | 21.1 | 24.2 | 24.2 |
| Yield Stress N/mm² | 23.5 | 22.0 | 19.2 | 22.3 | 22.0 | 21.1 | 24.2 | 24.2 |
| | Flexural ISO 178 (T = 23° C., II) | | | | | | | |
| Flexural modulus (secant) Mpa | 1160 | 1000 | 834 | 1120 | 915 | 912 | 1320 | 1320 |
| Flexural strength MPa | 29.8 | 26.8 | 21.0 | 26.0 | 24.1 | 23.5 | 30 | 30 |
| | Weight of testbar | | | | | | | |
| Weight g | | | | 26.9 | 26.1 | 26.1 | 27.0 | 27.0 |

What is claimed is:

1. A process for preparing a polymer composition comprising 60-80 wt. % of a recycled polypropylene (PP); 10-35 wt. % of a recycled polyethylene (PE); 5-20 wt. % of a polyolefin elastomer (POE); 0.1-10 wt. % styrene ethylene butylene styrene block copolymer (SEBS), wherein the wt. % is relative to the total weight of the polymer composition; wherein said polymer composition comprises at least 11 wt. % of polyolefin elastomer and styrene ethylene butylene styrene block copolymer, the process comprising the steps of:
  collecting the recycled polypropylene according to a DSD 324 or DSD 324-1 standard,
  collecting the recycled polyethylene according to a DSD 329 standard,
  mixing the recycled polypropylene, the recycled polyethylene, the POE and the SEBS to obtain the polymer composition.

2. The process according to claim 1, wherein the polymer composition comprises <0.5% by mass expanded polystyrene.

3. The process according to claim 2, comprising:
  60-77.5 wt. % of a recycled polypropylene;
  12-35 wt. % of a recycled polyethylene;
  6-20 wt. % of a polyolefin elastomer (POE);
  0.1-8 wt. % styrene ethylene butylene styrene block copolymer (SEBS).

4. The process according to claim 1, wherein the recycled PP content of the polymer composition is made-up of between 25-75 wt. % BOPP and between 25-75 wt. % rubber-containing injection moulded material and wherein wt. % is relative to the total amount of recycled PP.

5. The process according to claim 1, wherein the recycled PP is present between 60-80 wt. % within the polymer composition; wherein wt. % is relative to the total weight of the polymer composition.

6. The process according to claim 1, wherein the recycled PE comprises recycled High-Density Polyethylene (HDPE) to at least 90 wt. % and wherein the recycled PE has a density in the range of 0.94-0.97 g/cm³.

7. The process according to claim 1, wherein the recycled PE has a MFR 2.16 kg, 230° C. (g/10 min) of between 0.4-0.9 and a MVR 2.16 kg, 230° C. (m/10 min) of between 0.3-1.3 and wherein the recycled PE is present between 10-35 wt. %, within the polymer composition, wherein wt. % is relative to the total weight of the polymer composition.

8. The process according to claim 1, wherein the recycled PE is present in the polymer composition at a weight ratio between of 3:1-1:1 with the POE.

9. The process according to claim 1, wherein the polymer composition has a total rubber content of between 5-24 wt. % as determined with cold xylene solubles (CXS).

10. The process according to claim 1, wherein the POE used in the Invention comprises an ethylene (C2) octene (C8) metallocene rubbers with a blocky structure.

11. The process according to claim 1, wherein The POE has a density of between 0.85-0.89, an MFR of between 0.3-1, and wherein the POE is present at between 5-20 wt. %, within the polymer composition.

12. The process according to claim 1, wherein the composition has a Charpy notched impact strength of between 20-60 kJ/m$^2$ determined using ISO 179-1:eA2010.

13. The process according to claim 5, wherein the recycled PP is present between 60-77.5 wt. % within the polymer composition.

14. The process according to claim 6, wherein the recycled PE comprises recycled High-Density Polyethylene (HDPE) to at least 92 wt. %.

15. The process according to claim 9, wherein the polymer composition has a total rubber content of between 8-20 wt. % as determined with cold xylene solubles (CXS).

16. The process according to claim 12, wherein the composition has a Charpy notched Impact strength of between 22-55 kJ/m$^2$ determined using ISO 179-1:eA2010.

17. The process according to claim 13, wherein the recycled PP is present between 62-75 wt. %, within the polymer composition.

18. The process according to claim 14, wherein the recycled PE comprises recycled High-Density Polyethylene (HDPE) to at least 95 wt. %.

19. The process according to claim 15, wherein the polymer composition has a total rubber content of between 11-18 wt. %, as determined with cold xylene solubles (CXS).

20. The process according to claim 16, wherein the composition has a Charpy notched impact strength of between 26-51 determined using ISO 179-1:eA2010.

\* \* \* \* \*